(No Model.)
R. B. SMITH.
COTTON SEED PLANTER.
No. 312,393. Patented Feb. 17, 1885.
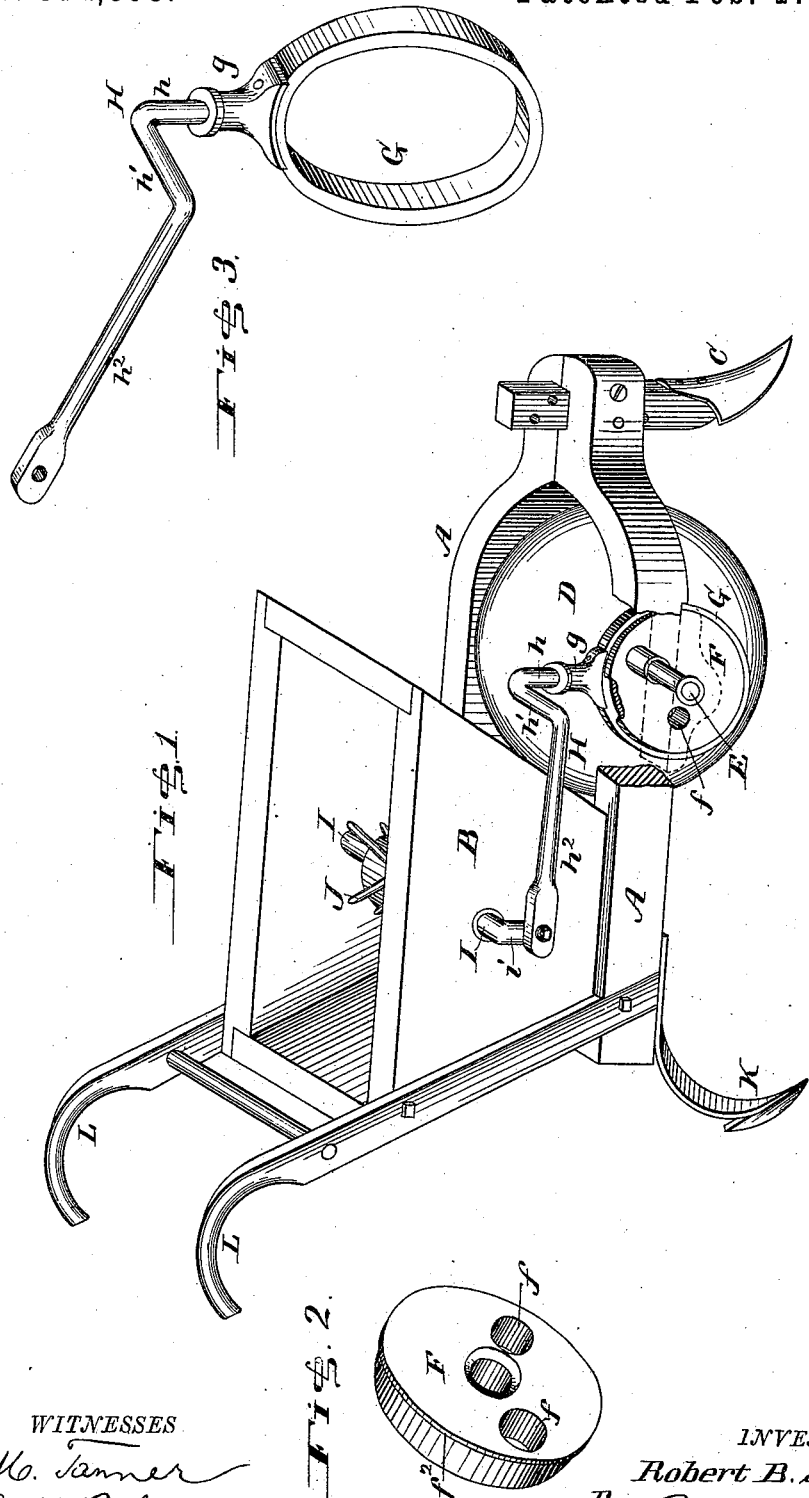
WITNESSES
A. M. Tanner
C. T. Belt
INVENTOR
Robert B. Smith
By Painter Ladd,
Attorneys.

UNITED STATES PATENT OFFICE.

ROBERT B. SMITH, OF LAFAYETTE, ALABAMA.

COTTON-SEED PLANTER.

SPECIFICATION forming part of Letters Patent No. 312,393, dated February 17, 1885.

Application filed May 8, 1884. (No model.)

*To all whom it may concern:*

Be it known that I, ROBERT B. SMITH, a citizen of the United States, residing at Lafayette, in the county of Chambers and State of Alabama, have invented certain new and useful Improvements in Cotton-Seed Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of cotton-seed planters in which a vibrating shaft having projecting teeth or fingers operates in a hopper and serves to expel the seed through a slot in the bottom of the latter.

The object of the invention is to provide a simple, convenient, and effective mechanism for operating the seed distributing or expelling shaft, such mechanism consisting of a ground-wheel that travels in the furrow formed by a shovel or plow, and carries an eccentric disk or plate provided with a series of perforations, and which is encircled by a peripheral sleeve or collar, from which extends a connecting-rod of a peculiar shape that is connected with a projecting crank-arm of the seed-distributing shaft, all as will be hereinafter more fully described, and then set forth in the claim.

In the drawings, Figure 1 is a perspective view of a cotton-seed planter constructed according to my invention. Fig. 2 is a detail view of a disk or plate having eccentric journal-openings and a central screw-hole for attaching it to the ground-wheel. Fig. 3 is a detail view of the doubly-bent connecting-rod and its sleeve or collar that encircles the eccentric disk of the ground-wheel.

The letter A designates a supporting-frame for the seed-hopper B and operating devices, that is preferably composed of two parallel beams converging at the front end into a central beam, to which the draft is applied in any suitable manner. The seed-hopper is supported upon the rear of said side beams, and has a bottom board, in which is made an elongated opening or slot for the delivery of the seed into the ground-furrow, that is formed by means of a shovel or plow, C, arranged at the front of the supporting-frame. In rear of said furrow-opener is arranged a ground-wheel, D, which has a rounded or wedge-shaped periphery for forming a well-defined furrow. This ground-wheel has a central shaft or axis, E, which is journaled in suitable boxes secured to the beams composing the supporting-frame. To one of the side faces of the ground-wheel is attached a disk or plate, F, which has a central hole for the passage of a screw or bolt that serves to hold it in place, and is also provided with one or several eccentrically-arranged openings, $f$, placed at different distances from the center of the disk, one of which receives the projecting end of the shaft or axis E. In this manner it is obvious that the disk F, with wheel-axis passing therethrough, constitutes an eccentric projection on the face of the wheel, for the object hereinafter stated, and that the throw of the eccentric can be increased or diminished by resetting the disk, with the shaft E passing through an outer or an inner hole, as required. The periphery of the disk F is slightly grooved, or has a projecting outer flange, $f^2$, for receiving and retaining an encircling collar or band, G, that fits loosely on the eccentric disk, and is carried around by the same. A projection or boss, $g$, on the periphery of the aforesaid band or collar receives a connecting-rod or pitman, H, which is composed of a vertical portion, $h$, rising directly from said boss or projection, a portion, $h'$, bent at right angles to said vertical portion, and a rearwardly-extending portion, $h^2$, extending from the outer end of the portion $h'$. The longitudinal part of the pitman is connected with a crank-arm, $i$, formed on the outer end of a shaft, I, which is journaled in the side walls of the seed-hopper.

The boss or projection on the band or collar G may have a screw-socket for the reception of the screw-threaded extremity of the vertical part of the pitman, or the latter may be formed with said projection.

It is obvious that the peculiar shape of the connecting-rod or pitman will permit the same to clear the frame and the seed-hopper mounted upon the supporting-frame, and that the rotation of the wheel D will cause the eccentric and its encircling-band to reciprocate or oscillate the connecting-rod for imparting a vibrating movement to the shaft I, passing through the seed-hopper. This shaft I is armed with projecting teeth or fingers J, which operate in the mass of seed contained in the hopper, and are arranged directly above the bottom aperture thereof, so that the seed will be forced or expelled through said aperture and delivered into the furrow formed by the plow and the ground-wheel following the latter. At the rear of the supporting-frame are arranged curved arms or plates K, which serve to cover the seed and operate in the same manner as other furrow-coverers. Guide-handles L rise from the rear of the planter-frame for controlling the movement thereof.

I am aware that eccentrics and connecting-rods are common instrumentalities for communicating motion to machinery; but when constructed and arranged in the manner proposed by me I attain a perfect and uniform vibration of the seed-distributing shaft and secure a simple and effective construction for making eccentric connection with the ground-wheel, and one that may be readily adjusted or disconnected. Moreover, the several perforations in the disk F enable the same to be adjusted on the axis E in several different positions, thereby varying the eccentric movement of said disk.

Having thus described my invention, what I claim as new, and desire to secure by Letters Patent, is—

The combination, in a cotton-seed planter, of a suitable frame, a hopper mounted thereon, a shaft piercing said hopper, terminating at one end in a crank, and carrying the feeding devices, as described, a ground-wheel mounted upon a suitable axis at the front of said frame, a disk provided with a series of perforations, each adapted to engage the end of said axis, and devices for connecting said disk with the crank end of the feed-shaft, substantially as set forth.

In testimony whereof I affix my signature in presence of two witnesses.

ROBERT B. SMITH.

Witnesses:
J. R. DOWDELL,
N. D. DENSON.